(12) United States Patent
Angus et al.

(10) Patent No.: US 6,227,399 B1
(45) Date of Patent: May 8, 2001

(54) TAMPER-EVIDENT FASTENING ASSEMBLY

(75) Inventors: Mark W. Angus; Dennis R. Gray, both of Erie, PA (US)

(73) Assignee: Bunzl Plastics Inc., Erie, PA (US)

( * ) Notice: Subject to any disclaimer, the term of this patent is extended or adjusted under 35 U.S.C. 154(b) by 0 days.

(21) Appl. No.: 09/447,824

(22) Filed: Nov. 23, 1999

(51) Int. Cl.⁷ .......................... B65D 50/00; B65D 55/10; F16L 57/00
(52) U.S. Cl. .................. 220/375; 138/96 R; 215/237; 215/253; 215/306; 215/901; 220/268; 220/315
(58) Field of Search .................... 220/375, 214, 220/268, 265, 315, 810, 833; 215/306, 253, 235, 237, 901; 285/3, 4, 908; 292/253; 138/96 R, 89.1, 89.2, 89.3, 89.4

(56) References Cited

U.S. PATENT DOCUMENTS

| | | | |
|---|---|---|---|
| 3,269,575 | * | 8/1966 | Hammes ............................ 215/253 |
| 4,339,056 | * | 7/1982 | Berkstresser, Jr. et al. ......... 220/375 |
| 5,090,583 | * | 2/1992 | Hoffman et al. ..................... 215/253 |
| 5,397,012 | | 3/1995 | Tison et al. . |
| 5,533,767 | * | 7/1996 | Georgopoulos et al. ............. 292/320 |
| 6,059,136 | * | 5/2000 | Lin ..................................... 220/212.5 |
| 6,070,769 | * | 6/2000 | Hornsby ............................... 222/529 |

* cited by examiner

Primary Examiner—Allan N. Shoap
Assistant Examiner—Niki M. Eloshway
(74) Attorney, Agent, or Firm—Oliff & Berridge PLC.

(57) ABSTRACT

A tamper-evident fastening assembly for an outlet of a conduit, including a closure member for covering the outlet of the conduit, a strap extending from the closure member, and first and second fasteners connected to the closure member. The first fastener secures a first portion of the strap to the conduit by forming a first loop. The second fastener secures a second portion of the strap to the closure member by forming a second loop. Removal of the closure member from the outlet breaks the second loop but leaves the first loop intact on the conduit.

19 Claims, 2 Drawing Sheets

TAMPER-EVIDENT FASTENING ASSEMBLY

BACKGROUND OF THE INVENTION

1. Field of Invention

This invention generally relates to a tamper-evident fastening assembly and a method for sealing an outlet of a conduit with the fastening assembly such that end users can readily tell if the outlet has been opened previously.

2. Description of Related Art

Tamper-proof caps are well known and commonly used in industrial applications. Such caps include a plug for closing an outlet and a one piece-molded flexible strap attached at one end to the plug and having a locking mechanism integral with the plug. The strap also includes at least one tooth at its free end to irreversibly insert into the locking mechanism. The strap forms a tight closed loop around a conduit with the plug covering the outlet. The strap must be broken in order to gain access to the outlet, thereby protecting the outlet before it is used and evidencing prior use or tampering if the strip is broken. See U.S. Pat. No. 5,397,012 to Tyson et al. for an example of a tamper-proof sealing plug assembly, the disclosure of which is herein incorporated by reference.

SUMMARY OF THE INVENTION

However, a problem exists in the industry in that those outlets which have tamper-evident covers do not include any structure that remains after the cap is first removed. Therefore, once removed, the purchaser or user has no idea whether a cap was previously located in or on the outlet. This causes uncertainty on the part of the customer or user because of the lack of tamper-proofing.

Therefore, it is the object of this invention to produce an economic, easily-used outlet sealing assembly which provides tamper evidence. The device has a cap sized to cover the outlet and a strap connected to the cap. The strap has a plurality of locking mechanisms for irreversible insertion into a first locking mechanism. The strap is looped around the conduit and this first loop is tightened by inserting the strap through the first locking mechanism. A second locking mechanism is also provided so that the strap can be formed into a second loop around the conduit and then irreversibly inserted into the second locking mechanism after insertion through the first locking mechanism. The device thereby forms a double loop when engaged. The second loop is broken on first use to remove the cap. This leaves the first loop intact as evidence of tampering and retains the cap to the conduit and can be reused to protect the outlet.

BRIEF DESCRIPTION OF THE DRAWINGS

The invention and its advantages will be better understood in relation to the following drawings in which like reference numerals refer to like elements and wherein.

DETAILED DESCRIPTION OF PREFERRED EMBODIMENTS

Figure 1:
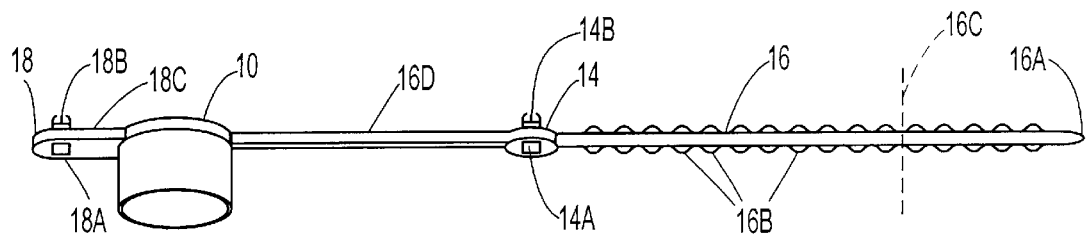
FIG. 1 is an example of a tamper-evident fastening assembly after manufacture and before use.

FIG. 1 illustrates an exemplary embodiment of the tamper-evident fastening assembly as manufactured and before mounting or use on a conduit. Preferably, the assembly is a one piece molded plastic assembly, but other materials could be used. The assembly includes a closure assembly (cap) 10 sized to fit over an outlet of a conduit. The shape and/or size of the cap is variable depending on the size and/or shape of the outlet to be covered. The cap friction fits over the outlet and protects it from dust or damage while, for example, the conduit (or container on which the conduit is mounted) is being transported, stored or installed. If desired, the cap can be sized to seal or plug the outlet to prevent entry of substances into the conduit and/or to prevent exit of substances from the conduit.

The cap 10 includes a strap 16 extending from one side of the cap. The strap has one end connected to the cap and an opposite free end 16A. The length of the strap is variable depending on the size of the conduit to which it will be attached. In an exemplary embodiment, the strap is about 11 inches or 28 cm long, but longer or shorter straps are possible.

A first fastener 14 is provided in the strap 16. The first fastener 14 preferably has a hole 14A through which the free end 16A of the strap 16 can be inserted to form a first loop 18 (see FIG. 2). The fastener 14 secures a first portion of the strap that defines the first loop. In an exemplary embodiment, the strap has a plurality of projections such as teeth 16B which engage with locking members 14B that surround the hole 14A in the first fastener 14. The locking members 14B allow the teeth 16B to pass through the fastener when the free end 16A of the strap is inserted in the hole 14A and the strap 16 is drawn through the fastener 14. However, the locking members 14B prevent the teeth 16B from passing in the opposite direction to withdraw the strap 16 from the fastener 14. Therefore, the strap 16 is irreversibly inserted into the fastener 14 to form the first loop 18.

Figure 2:
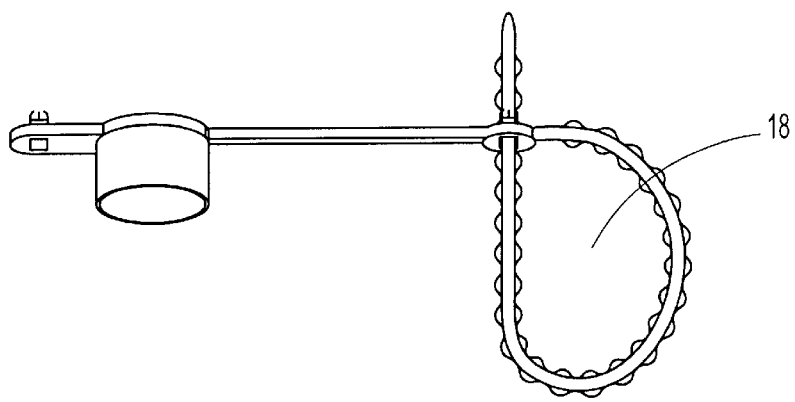
FIG. 2 illustrates the fastening assembly with a first locking mechanism engaged to form a first loop.
Figure 5:
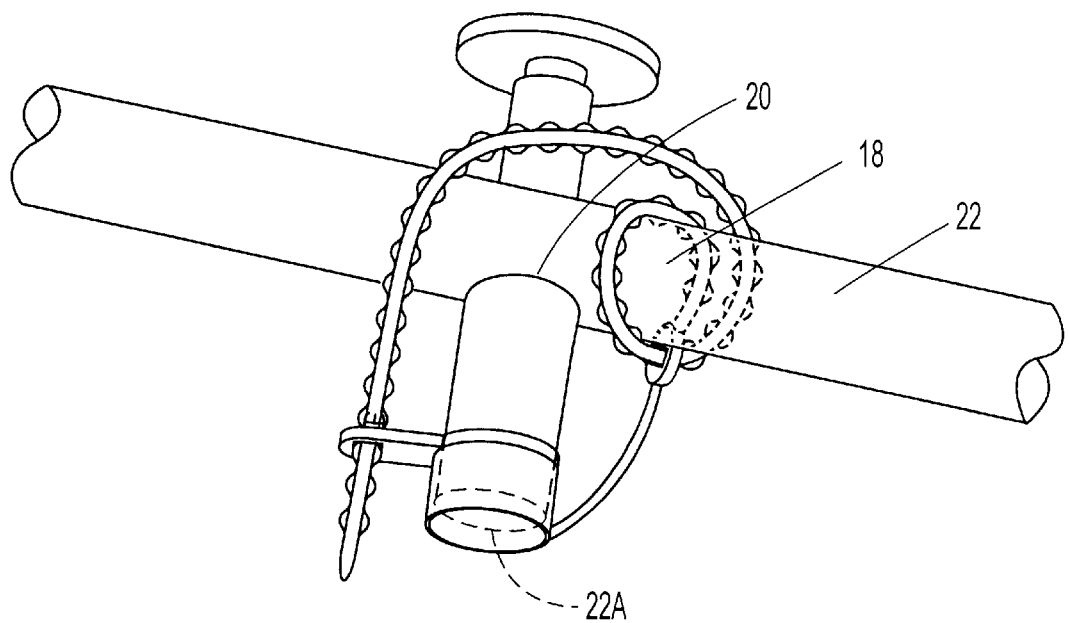
FIG. 5 illustrates the fastening assembly with both locking mechanisms engaged and with the strap wrapped around a conduit with the cap covering the outlet.

As illustrated in FIGS. 2 and 5, the first loop 18 can be of any size. However, it is preferred that the strap 16 is drawn through the first fastener 14 to such an extent that the first loop is tightly wound around the conduit 22 illustrated in FIG. 5.

The first fastener 14 is preferably located on the strap 16, preferably a distance of about 2–3 inches or 6–7 cm from the cap. This distance is variable, but should be long enough to allow the strap to wrap around the conduit and to attach or remove the cap from the outlet 22a illustrated in FIG. 5. The portion of the strap between the first fastener 14 and the cap 10 can be a retaining portion 16D that retains the cap 10 on the conduit by virtue of its retaining portion 16D being attached to the first loop 18. However, the first fastener 14 could be located elsewhere on the assembly as long as it is secured to the cap 10.

Figure 3:
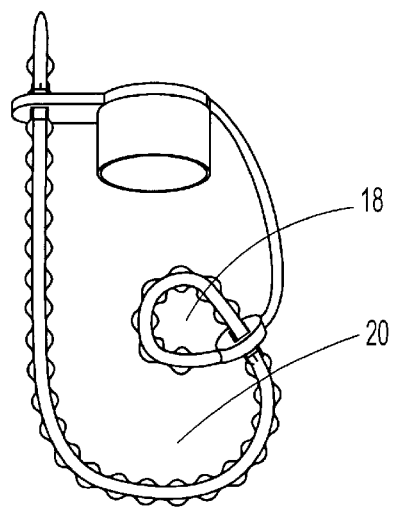
FIG. 3 illustrates the fastening assembly with a second locking mechanism engaged to form a second loop.

A second fastener 18 is also located on the cap 10, and preferably has the same construction as the first fastener 14 (i.e., hole 18A surrounded by locking members 18B that engage the teeth 16B on the strap 16). As illustrated in FIGS. 3 and 5, the free end 16A of the strap 16 is irreversibly inserted into the second fastener 18 to form a second loop 20. A second portion of the strap is defined as the portion of the strap in the second loop between the first and second fasteners 14, 18. The second portion of the strap 16 is wound around the conduit 22 and inserted into the second fastener 18 to form the second loop 20.

In operation, as illustrated in FIGS. 2–5, the cap 10 is placed on the outlet 22A and the free end 16A of the strap 16 is wound around the conduit 22 and inserted into the first fastener 14 to form the first loop 18 (FIGS. 2 and 5). The strap is drawn through the first fastener 14 such that the first loop 18 forms a tight friction fit around the conduit 22. The free end 16A of the strap 16 is then wound around the conduit 22 and inserted into the second fastener 18 to form the second loop 20 (FIGS. 3 and 5). The strap 16 is then drawn through the second fastener 18 such that the second 20 loop forms a tight loop that prevents the cap 10 from being removed from the outlet 22A (FIG. 5).

Figure 4:
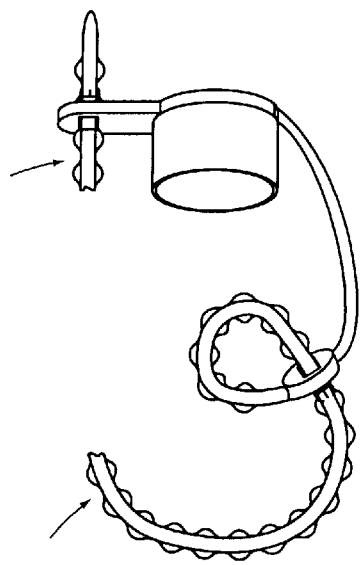
FIG. 4 illustrates the fastening assembly after first use where the second loop is broken.

When it is time to remove the cap 10 from the outlet 22A, the second loop is broken (FIG. 4). In an exemplary embodiment, the strap 16 can include a frangible element 16C near the free end 16A of the strip. The frangible element 16C allows for readily breaking the second loop 20. When the second loop is broken, the cap 10 can be removed from the outlet 22A but remains attached to the conduit via the retaining portion 16D.

When the second loop is broken, there is a visual indication that the cap may have been removed from the outlet 22A. Further, even when the second loop is broken, the first loop remains intact. The assembly therefore has the advantage that: 1) the first loop remains on the conduit—even if the second loop and fastener portion of the strap are cut away, there is still a visual indication remaining (i.e., the first loop 18) that the outlet 22A has been exposed; and 2) the first loop retains the cap in an accessible position (via the retaining portion 16D) where it could be reattached to the outlet 22A for reuse.

It is noted that the second fastener 18 can be attached to the cap 10 via an extension 18C, or can be located directly on the cap 10. When the extension 18C is used, the second fastener 18 can be spaced back from the end of the extension to form a gripping portion 18 that allows the user to easily grip the cap for attachment to or removal from the outlet 22A. It is also noted that a frangible element could be provided in the extension 18C to assist in breaking the second loop.

While this invention has been described in conjunction with specific embodiments outlined above, it is evident that many alternative, modifications and variations will be apparent to those skilled in the art. For example, other types of fasteners could be used. Also, the fasteners could be separate elements from the strap, instead of the one-piece construction described above. Accordingly, the preferred embodiments of the invention as set forth are intended to be illustrative and not limiting. Various changes may be made without departing from the spirit and scope of the invention as defined herein.

What is claimed is:

1. A tamper-evident fastening assembly for an outlet of a conduit, comprising:
   a closure member for covering the outlet of the conduit;
   a first fastener connected to the closure member;
   a single strap extending from the first fastener, the first fastener securing a first portion of the strap to the conduit by forming a first loop around the conduit; and
   a second fastener connected to the closure member for securing a second portion of the strap to the closure member by forming a second loop such that removal of the closure member from the outlet breaks the second loop but leaves the first loop intact on the conduit.

2. The tamper-evident fastening assembly according to claim 1, wherein, the strap includes a frangible element for breaking the second loop.

3. The tamper-evident fastening assembly according to claim 1, wherein the strap has a plurality of projections that engage locking members within the first and second fastening members, the locking members allowing insertion of the strap into the first and second fastener but preventing withdrawal of the strap from the first and second fasteners.

4. The tamper-evident fastening assembly according to claim 1, wherein the first fastener is spaced from the closure member by a retainer portion.

5. The tamper-evident fastening assembly according to claim 1, wherein the second fastener is located on one side of the closure member, and the strap extends from an opposite side of the closure member.

6. The tamper-evident fastening assembly of claim 1, wherein the second fastener is secured to the closure member by an extension.

7. The tamper-evident fastening assembly of claim 6, wherein the second fastener is spaced from a free end of the extension and a gripping portion is defined in the extension between the free end and the second fastener.

8. The tamper-evident fastening assembly of claim 6, wherein the extension includes a frangible element.

9. A method for securing a tamper-evident fastening assembly to an outlet of a conduit, the fastening assembly having a cap with a single strap extending therefrom, the method comprising:
   placing the cap over the outlet;
   looping a first portion of the strap around the conduit to form a first loop;
   securing the first loop to the conduit by inserting the strap through a first fastener;
   looping a second portion of the strap around the conduit to form a second loop; and
   connecting the second portion of the strap to the cap by inserting the strap through a second fastener connected to the cap.

10. The method of claim 9, further comprising removing of the cap from the outlet by breaking the second loop while leaving the first loop intact.

11. The method of claim 10, wherein the cap remains attached to the first loop after the cap is removed.

12. A tamper-evident fastening assembly for an outlet of a conduit, comprising:
   a closure member for covering the outlet of the conduit;
   a strap extending from the closure member;
   a first fastener connected to the closure member for securing a first portion of the strap to the conduit by forming a first adjustable loop around the conduit; and
   a second fastener connected to the closure member for securing a second portion of the strap to the closure member by forming a second adjustable loop such that removal of the closure member from the outlet breaks the second adjustable loop but leaves the first adjustable loop intact on the conduit.

13. The tamper-evident fastening assembly according to claim 12, wherein, the strap includes a frangible element for breaking the second adjustable loop.

14. The tamper-evident fastening assembly according to claim 12, wherein the strap has a plurality of projections that engage locking members within the first and second fastening members, the locking members allowing insertion of the strap into the first and second fastener but preventing withdrawal of the strap from the first and second fasteners.

15. The tamper-evident fastening assembly according to claim 12, wherein the first fastener is located on the strap and spaced from the closure member by a retainer portion.

16. The tamper-evident fastening assembly according to claim 12, wherein the second fastener is located on one side of the closure member, and the strap extends from an opposite side of the closure member.

17. The tamper-evident fastening assembly of claim 12, wherein the second fastener is secured to the closure member by an extension.

18. The tamper-evident fastening assembly of claim 17, wherein the second fastener is spaced from a free end of the extension and a gripping portion is defined in the extension between the free end and the second fastener.

19. The tamper-evident fastening assembly of claim 17, wherein the extension includes a frangible element.

* * * * *